United States Patent
Ambrus et al.

(10) Patent No.: US 12,151,361 B2
(45) Date of Patent: Nov. 26, 2024

(54) ROBUST AND PERCEPTIVE MANIPULATION THROUGH SOFT-BUBBLE GRIPPERS AND MONOCULAR DEPTH

(71) Applicant: Toyota Research Institute, Inc., Los Altos, CA (US)

(72) Inventors: Rares A. Ambrus, San Francisco, CA (US); Vitor Guizilini, Santa Clara, CA (US); Naveen Suresh Kuppuswamy, Arlington, MA (US); Andrew M. Beaulieu, Somerville, MA (US); Adrien D. Gaidon, Mountain View, CA (US); Alexander Alspach, Woburn, MA (US)

(73) Assignee: Toyota Research Institute, Inc., Los Altos, CA (US)

( * ) Notice: Subject to any disclaimer, the term of this patent is extended or adjusted under 35 U.S.C. 154(b) by 950 days.

(21) Appl. No.: 17/147,935

(22) Filed: Jan. 13, 2021

(65) Prior Publication Data
US 2022/0024048 A1 Jan. 27, 2022

Related U.S. Application Data

(60) Provisional application No. 63/057,011, filed on Jul. 27, 2020.

(51) Int. Cl.
*B25J 13/08* (2006.01)
*B25J 9/16* (2006.01)
*G01B 11/24* (2006.01)

(52) U.S. Cl.
CPC ........... *B25J 13/082* (2013.01); *B25J 9/1612* (2013.01); *B25J 9/163* (2013.01); *B25J 9/1697* (2013.01); *G01B 11/24* (2013.01)

(58) Field of Classification Search
CPC ......... G01B 11/00; G01B 11/16; G01B 11/24; G01B 11/2408; G01B 11/255;
(Continued)

(56) References Cited

U.S. PATENT DOCUMENTS 7,460,216 B2 12/2008 Lecomte et al.
8,231,158 B2 7/2012 Dollar et al.
(Continued)

FOREIGN PATENT DOCUMENTS

WO 02/063549 A1 8/2002

OTHER PUBLICATIONS

Alspach et al. "Soft-bubble: A highly compliant dense geometry tactile sensor for robot manipulation." Presented at RoboSoft, Apr. 2019. (Year: 2019).*

(Continued)

*Primary Examiner* — Benjamin R Schmitt
(74) *Attorney, Agent, or Firm* — DINSMORE & SHOHL LLP

(57) ABSTRACT

A deformable sensor comprises an enclosure comprising a deformable membrane, the enclosure configured to be filled with a medium, and an imaging sensor, disposed within the enclosure, having a field of view configured to be directed toward a bottom surface of the deformable membrane. The imaging sensor is configured to capture an image of the deformable membrane. The deformable sensor is configured to determine depth values for a plurality of points on the deformable membrane based on the image captured by the imaging sensor and a trained neural network.

18 Claims, 7 Drawing Sheets

(58) Field of Classification Search
CPC ........ G01B 11/30; G01L 5/226; B25J 13/082; B25J 9/163; B25J 9/1697
See application file for complete search history.

(56) References Cited

U.S. PATENT DOCUMENTS

| | | | |
|---|---|---|---|
| 8,317,701 | B2 | 11/2012 | Livne et al. |
| 9,605,952 | B2 | 3/2017 | Rose et al. |
| 9,802,314 | B2 | 10/2017 | Yamane et al. |
| 9,868,181 | B2 | 1/2018 | Osato et al. |
| 10,201,901 | B2 | 2/2019 | Sato |
| 2009/0326714 | A1 | 12/2009 | Buckingham et al. |
| 2012/0240691 | A1 | 9/2012 | Wettels et al. |
| 2015/0306761 | A1* | 10/2015 | O'Connor .............. G06N 3/049 700/250 |
| 2016/0288330 | A1* | 10/2016 | Konolige ............. H04N 13/239 |
| 2017/0100841 | A1 | 4/2017 | Noda et al. |
| 2017/0239821 | A1 | 8/2017 | Lessing et al. |
| 2019/0091871 | A1 | 3/2019 | Alspach et al. |
| 2020/0164505 | A1* | 5/2020 | Boer ........................ G06T 7/70 |

OTHER PUBLICATIONS

Guo et al. "BTS-DSN: Deeply Supervised Neural Network with Short Connections for Retinal Vessel Segmentation." Sep. 23, 2019. (Year: 2019).*

Mallya et al. "PackNet: Adding Multiple Tasks to a Single Network by Iterative Pruning." May 13, 2018. (Year: 2018).*

13e1sight, Inc., "GelSight Benchtop Scanner", 2017, 1 page, http://www.gelsight.com/.

Alexander Alspach et al., "Design of a Soft Upper Body Robot for Physical Human-Robot Interaction", Disney Research, Pittsburgh, PA, Nov. 4, 2015, https://disneyresearch.com/publication/design-of-a-soff-upper-body-obot/, 8 pages.

Dimitris Hristu et al., Technical Research Report, "The Performance of a Deformable-Membrane Tactile Sensor: Basic Results on Geometrically-Defined Tasks", Center for Dynamics and Control of Smart Structures (CDCSS), 1999, Harvard University and University of Maryland, 8 pages, http://www.dtic.mil/dtic/tr/fulltext/u2/a439988.pdf.

Joao Bimbo et al., "In-Hand Object Pose Estimation Using Covariance-Based Tactile To Geometry Matching", IEEE Robotics and Automation Letters, Jan. 2016, Doi: 10.1109/LRA.2016.2517244, https://www.researchgate.net/publication/290509006_1n-Hand_Object_Pose_Estimation_Using_Covariance-Sased_Tactile_To_Geometry_Matching, 9 pages.

Joohyung Kim et al., "3D Printed Soft Skin for Human-Robot Interaction", Disney Research, Sep. 28, 2015, 1 page.

Joohyung Kim et al., "3D Printed Soft Skin for Safe Human-Robot Interaction", Disney Research, Pittsburgh, PA, https://www.disneyresearch.com/publication/3dprinted-soft-skin/, Sep. 28, 2015, DOI: 10.1109/ROS.2015.7353705, 7 pages.

Leif P. Jentoft et al., "Determining Object Geometry with Compliance and Simple Sensors", In the Proceedings of the IEEE/RSJ International Conference on Intelligent Robots and Systems, San Francisco, CA, Sep. 25-30, 2011: 3468-3473, doi: 10.1109/IROS.2011.6094692, http:/nrs.harvard.edu/urn-3:HUL.InstRepos:22108933, 7 pages.

Micah K. Johnson et al., "Microgeometry Capture using an Elastomeric Sensor", ACM Trans. Graph. 30 (4) 2011) 46:1-46:8, doi: 10.1145/2010324.1964941. 8 pages.

Micah K. Johnson et al., "Retrographic sensing for the measurement of surface texture and shape", Jun. 20, 2009, B pages. DOI: 10.1109/CVPR.2009.5206534.

* cited by examiner

ROBUST AND PERCEPTIVE MANIPULATION THROUGH SOFT-BUBBLE GRIPPERS AND MONOCULAR DEPTH

CROSS-REFERENCE TO RELATED APPLICATIONS

This application claims the benefit of U.S. Provisional Application 63/057,011, filed Jul. 27, 2020, which is incorporated by reference in its entirety.

TECHNICAL FIELD

Embodiments described herein generally relate to contact sensors and, more particularly, to robust and perceptive manipulation through soft-bubble grippers and monocular depth.

BACKGROUND

Manipulation of objects by robotic arms or other robotic devices in cluttered environments such as homes may require a robotic arm to perform stable grasps, precise placement and robustness against external contact. In order to perform these functions, a robotic arm may utilize one or more contact sensors.

Contact sensors may be used to determine whether or not one object is in physical contact with another object. For example, robots may use contact sensors to determine whether a portion of the robot is in contact with an object. Control of the robot may then be based at least in part on signals from one or more contact sensors.

U.S. Pat. No. 10,549,428 discloses a deformable/compliant contact sensor for a robotic arm comprising a deformable membrane coupled to a housing that maintains an internal sensor capable of detecting displacement of the deformable membrane by contact with an object. As disclosed therein, the internal sensor comprises a time-of-flight sensor capable of sensing depth. As such, when an object contacts the disclosed contact sensor, the membrane may deform based on the shape of the object. The time-of-flight sensor may then detect a depth of various points on the membrane to determine how the membrane has deformed, and consequently, to determine the shape of the object.

However, the contact sensor described above requires the use of a time-of-flight sensor. Time-of-flight sensors tend to be larger than other types of sensors (e.g., cameras). Thus, using a time-of-flight sensor may limit how small the contact sensor may be. In addition, time-of-flight sensors tend to have range limitations compared to other types of sensors (e.g., cameras). Accordingly, there is a need for a contact sensor that does not utilize a time-of-flight sensor.

SUMMARY

In one embodiment, a deformable sensor may include an enclosure comprising a deformable membrane, the enclosure configured to be filled with a medium, and an imaging sensor disposed within the enclosure, having a field of view configured to be directed toward a bottom surface of the deformable membrane. The imaging sensor may be configured to capture an image of the deformable membrane. The deformable sensor may be configured to determine depth values for a plurality of points on the deformable membrane based on the image captured by the imaging sensor and a trained neural network.

In another embodiment, a method may include pressing a training object against a deformable membrane of a deformable sensor, the deformable sensor including an enclosure comprising the deformable membrane, the enclosure configured to be filled with a medium. The may further include, with an imaging sensor disposed within the enclosure, capturing an image of the deformable membrane while the training object contacts the deformable membrane. The method may further include determining a depth value associated with each pixel of the image captured by the imaging sensor. The method may further include storing the image of the deformable membrane and the depth value associated with each pixel of the image as a training example for a neural network. The method may further include using the training example to train the neural network to estimate the depth value associated with each pixel based on the image of the deformable membrane.

In another embodiment, a method may include pressing an object against a deformable membrane of a deformable sensor, the deformable sensor comprising an enclosure including the deformable membrane, the enclosure configured to be filled with a medium. The method may further include, with an imaging sensor disposed within the enclosure, capturing an image of the deformable membrane while the object contacts the deformable membrane. The method may further include using a trained neural network to determine a depth value associated with each pixel of the image captured by the imaging sensor.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

As humans, our sense of touch allows us to determine the shape of an object without looking at the object. Further, our sense of touch provides information as to how to properly grasp and hold an object. Our fingers are more sensitive to touch than other parts of the body, such as arms. This is because we manipulate objects with our hands.

Robots are commonly equipped with end effectors that are configured to perform certain tasks. For example, an end effector of a robotic arm may be configured as a human hand, or as a two-fingered gripper. However, robots do not have varying levels of touch sensitivity as do humans. End effectors may include sensors such as pressure sensors, but such sensors provide limited information about the object that is in contact with the end effector. Thus, the robot may damage a target object by using too much force, or drop the object because it does not properly grasp the object.

Further, in some applications, a deformable/compliant end effector may be desirable. For example, a deformable end effector may be desirable in robot-human interactions. Further, a deformable/compliant end effector may be desirable when the robot manipulates fragile objects.

Embodiments of the present disclosure are directed to deformable/compliant contact and/or geometry sensors (hereinafter "deformable sensors") that not only detect contact with a target object, but also detect the shape, geometry, pose and contact force of the target object. Particularly, the deformable sensors described herein comprise a deformable membrane coupled to a housing that maintains a sensor capable of detecting displacement of the deformable membrane by contact with an object. The deformable sensors described herein not only detect the pressure or force that is applied to the deformable membrane, but can also detect the geometry and pose of the object. Thus, the deformable sensors described herein provide a robot (or other device) with a sense of touch when manipulating objects.

Figure 1:
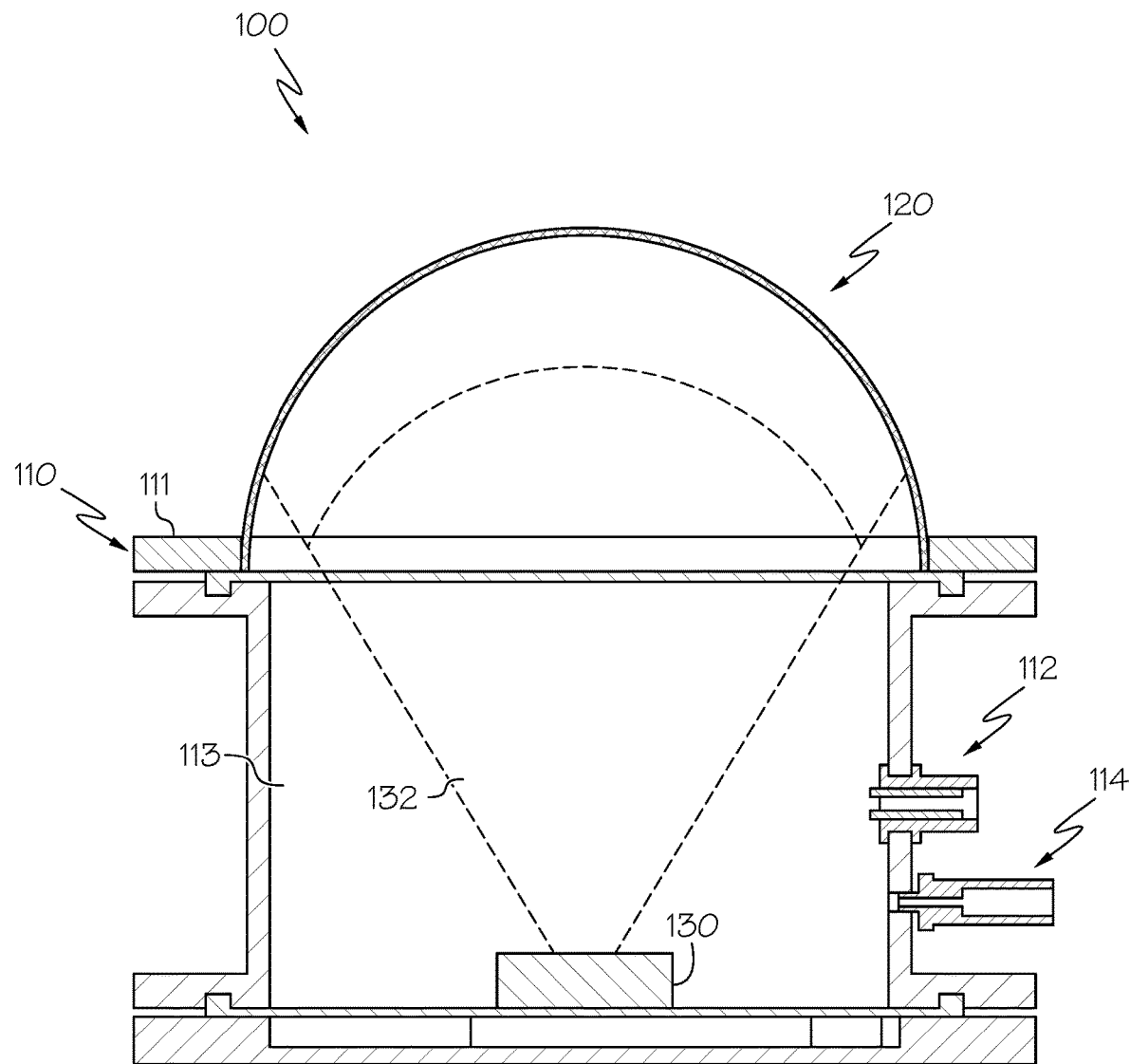
FIG. 1 schematically depicts a cross-sectional view of an example deformable sensor according to one or more embodiments described and illustrated herein.
Figure 2:
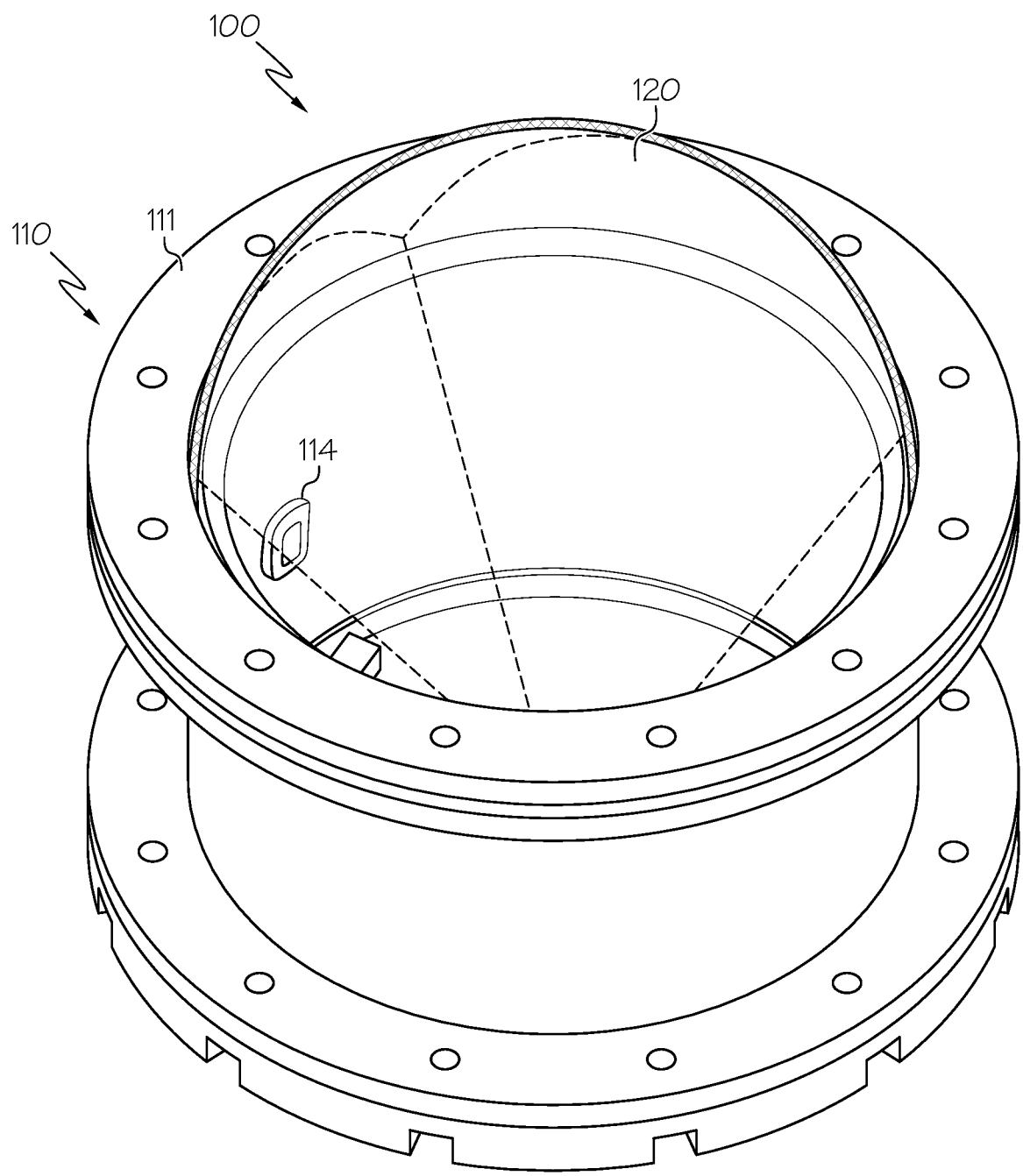
FIG. 2 schematically depicts a top perspective view of the example deformable sensor depicted by FIG. 1 according to one or more embodiments described and illustrated herein.

Referring now to FIGS. 1 and 2, an example deformable sensor 100 is schematically illustrated. FIG. 1 is a front cross-sectional view of the example deformable sensor 100 and FIG. 2 is a top perspective view of the example deformable sensor 100. The example deformable sensor 100 generally comprises a housing 110 and a deformable membrane 120 coupled to the housing 110, such as by an upper portion 111 of the housing 110. The housing 110 and the deformable membrane 120 define an enclosure 113 that is filled with a medium through one or more passthroughs 112, which may be a valve or any other suitable mechanism. The passthrough 112 may be utilized to fill or empty the enclosure. In one example, the medium is gas, such as air. Thus, air may be pumped into the enclosure 113 to a desired pressure such that the deformable membrane 120 forms a dome shape as shown in FIG. 1, although any suitable shape may be utilized in other embodiments. In another example, the medium is a gel, such as silicone or other rubber-like substance. In some embodiments a substance such as solid silicone may be cast in a given shape before assembly of the deformable sensor 100. In various embodiments, the medium may be anything that is transparent to an internal sensor (discussed in more detail below). The medium may include clear/transparent rubbers in some embodiments. In other embodiments the medium may be a liquid. In some examples, the deformable membrane 120 and the medium within the enclosure 113 may be fabricated of the same material, such as, without limitation, silicone. In some embodiments the deformable sensor 100 may be mountable. For example, the enclosure 113 may include brackets to be mounted any suitable object (such as a robot) or material. The deformable membrane 120 may be a latex or any other suitable material, such as a suitably thin, non-porous, rubber-like material.

The deformability of the deformable sensor 100 may be tuned/modified by changing the material of the deformable membrane 120 and/or the pressure within the enclosure 113. By using a softer material (e.g., soft silicone), the deformable sensor 100 may be more easily deformed. Similarly, lowering the pressure within the enclosure 113 may also cause the deformable membrane 120 to more easily deform, which may in turn provide for a more deformable sensor 100.

An internal sensor 130 capable of sensing depth may be disposed within the enclosure 113, which may be measured by the depth resolution of the internal sensor 130. The internal sensor 130 may have a field of view 132 directed through the medium and toward a bottom surface of the deformable membrane 120. As described in more detail below, the internal sensor 130 may be capable of detecting deflections of the deformable membrane 120 when the deformable membrane 120 comes into contact with an object.

A conduit 114 may be utilized in the enclosure 113 to provide power and/or data/signals, such as to the internal sensor 130 by way of a conduit, such as for USB (universal serial bus) or any other suitable type of power and/or signal/data connection. As used herein, an airtight conduit may include any type of passageway through which air or any other fluid (such as liquid) cannot pass. In this example, an airtight conduit may provide a passageway through which solid object (such as wires/cables) may pass through with an airtight seal being formed around such wires/cables at each end of the airtight conduit. Other embodiments may utilize wireless internal sensors 130 to transmit and/or receive data and/or power. In various embodiments where the medium is not a gas, such as silicone, the enclosure 113 and/or conduit 114 may not necessarily be airtight.

In operation, as an object is pressed into the deformable membrane 120, the object may impart its shape into the deformable membrane 120 such that the deformable membrane 120 conforms to the shape of the object. The internal sensor 130 may detect the geometry and/or pose of the displaced deformable membrane 120, as described herein. The deformable sensor 100, therefore, may not only detect the presence of contact with an object, but also the geometry of the object. In this manner, a robot equipped with a deformable sensor 100 may determine the geometry of an object based on contact with the object. Additionally, a geometry and/or pose of the object may also be determined based on the geometric information sensed by the deformable sensor 100. In some embodiments, the deformable sensor 100 may also determine how much force is being exerted on a target object.

In some embodiments, an optional filter layer may be disposed on a bottom surface of the deformable membrane 120. The deformable bottom surface of the deformable membrane 120 may be pattered (e.g., a grid pattern, a dot pattern, or any other suitable type pattern) that may be detected, by way of non-limiting examples, a stereo-camera to detect displacement. The filter layer may be configured to aid the internal sensor 130 in detecting deformation of the deformable membrane 120. In some embodiments, the filter layer may reduce glare or improper reflections of one or more optical signals emitted by the internal sensor 130. In some embodiments, the filter layer may scatter one or more optical signals emitted by the internal sensor 130. The filter layer may be an additional layer secured to the bottom surface of the deformable membrane 120, or it may be a coating and/or pattern applied to the bottom surface of the deformable membrane 120.

In some embodiments, an internal sensor filter may be disposed within the field of view 132 of the internal sensor 130 and may reduce glare or improper reflections of any optical signals emitted by the internal sensor 130. In some embodiments, the internal sensor filter may scatter one or more optical signals emitted by the internal sensor 130. In some embodiments, both the internal sensor filter and the filter layer discussed above may be utilized.

In some embodiments, a grid pattern may be applied to a bottom surface of the deformable membrane 120 to assist in the detection of the deformation of the deformable membrane 120. For example, the grid pattern may assist in the detection of the deformation when the internal sensor 130 is a stereo-camera. For example, varying degrees of distortion to the grid pattern may be utilized to discern how much deformation has occurred. In this example, the distance between parallel lines and/or measuring curvature of lines in the grid pattern may be used to determine the amount of deformation at each point in the grid. It should be understood that embodiments are not limited to grid pattern, as other types of patterns are possible, such as dots, shapes, and the like. The pattern on the bottom surface of the deformable membrane 120 may be random, and not necessarily arranged in any particular grid pattern.

As explained above, in known examples, the internal sensor 130 may comprise a time-of-flight sensor capable of measuring depth. In these examples, the time-of-flight sensor may emit an optical signal (e.g., an infrared signal) and may have individual detectors (i.e., "pixels") that detect how long it takes for the reflected signal to return to the sensor. However, utilizing a time-of-flight sensor may not be ideal for a variety of reasons. A time-of-flight sensor may be larger than other types of sensors. As such, in order to accommodate a time-of-flight sensor, the sensor 100 may need to be larger than may otherwise be desired, thereby constraining the size of the sensor 100. In addition, a time-of-flight sensor may have undesirable range limitations. In particular, at very close ranges (e.g., less than 10 centimeters), a time-of-flight sensor may not properly determine depths. Accordingly, in embodiments disclosed herein, the internal sensor 130 comprises an imaging sensor, as described in further detail below.

In embodiments disclosed herein, the internal sensor 130 may comprise an imaging sensor (e.g., an RGB sensor) configured to capture a two-dimensional image of an interior surface of the membrane 120 and determine depth of the various points of the membrane 120 based on the captured image. Estimating depth from a single image is inherently an ill-posed problem since there are infinite possible world states that could have generated the image. However, it is possible to train a neural network to learn appearance-based features capable of outputting a dense depth map containing per-pixel distance estimates. Accordingly, the internal sensor 130 may utilize a trained neural network to estimate depth based on a captured image, as disclosed herein.

In one example, the internal sensor 130 may comprise a monocular configured to capture an image of the membrane 120. However, in other examples, the internal sensor 130 may comprise any other type of camera or imaging sensor capable of capturing images. In embodiments, the internal sensor 130 may capture an image of the membrane 120 when it is deformed by an object and may determine a depth value for each pixel of the captured image utilizing a trained neural network, as described below. In some examples, the internal sensor 130 may capture an image of the membrane 120 and may transmit data of the captured image to a remote computing device, such as a processor of a robot, that may determine depth values of the membrane 120 based on the data of the captured image.

In embodiments, a neural network may be trained to receive an image captured by the internal sensor 130 and estimate a depth value for each pixel of the image during a training phase. After the neural network is trained, the neural network may be used to estimate a depth value for each pixel of a captured image during an operation phase. In order to train such a neural network, a large number of training examples may be acquired during the training phase, and the neural network may be trained using supervised learning techniques, as disclosed herein. In particular, training examples may comprise captured example images along with ground truth values comprising known depth values for the pixels of each captured image.

In the example of FIG. 1, training examples may be acquired by utilizing an internal sensor 130 comprising an RGB-D sensor that is able to capture RGB images (e.g., color images) as well as depth information. For example, during training of the neural network, the internal sensor 130 may comprise a combination of an RGB imaging sensor and a time-of-flight sensor. As such, the RGB imaging sensor may capture an RGB image of the membrane 120 and the time-of-flight sensor may determine depth values for the membrane 120. In some examples, the internal sensor 130 may capture a grayscale image rather than an RGB image. In particular, the time-of-flight sensor may emit an optical signal (e.g., an infrared signal) and may have individual detectors (i.e., pixels) to detect how long it takes for the reflected signal to return to the sensor. Accordingly, each pixel of the time-of-flight sensor may determine a depth value for a point on the membrane 120.

Thus, to acquire a single training example, an object may be pressed against the membrane 120 to deform the membrane 120 based on the shape of the object. The RGB imaging sensor may then capture an image of the deformed membrane 120 and the time-of-flight sensor may determine depth values for the deformed membrane 120 based on time-of-flight measurements. Accordingly, the corresponding training example may comprise the captured image of the deformed membrane 120 as well as the depth values determined by the time-of-flight sensor. In particular, a depth value determined by the time-of-flight sensor may be associated with each pixel of the image captured by the imaging sensor. Thus, the determined depth values may be used as the ground truth values for training the neural network, as described in further detail below.

While the above example discloses utilizing a time-of-flight sensor to determine ground truth values, it should be understood that in other examples, other methods of determining depth values may be used. For example, sensors other than a time-of-flight sensor may be used to determine depth values associated with a captured image, such as barometers, pressures sensors, and the like. Alternatively, depth values associated with a captured image may be determined in other manners as well.

By deforming the membrane 120 with a variety of different objects, a variety of training examples may be acquired. Once a sufficient number of training examples are acquired, a neural network may be trained using the training examples, as described in further detail below. In particular, the neural network may be trained to receive an input image of the membrane 120 captured by the internal sensor 130 and output an estimated depth for each pixel of the image.

Once a neural network is trained, the trained neural network may be used by the sensor 100 to estimate depth values for an image captured by the internal sensor 130. In particular, when an object is pressed against the membrane 120, causing the membrane 120 to deform, the internal sensor 130 may capture an image of the deformed membrane 120. The captured image may then be input into the trained neural network, which may output an estimated depth value for each pixel of the captured image. The sensor 100 may then determine the shape of the object pressed against the sensor 100 based on the estimated depth values. Thus, in operation, the sensor 100 may determine depth values of the deformed membrane 120 using only an imaging sensor rather than a time-of-flight or other specialized depth sensor. Accordingly, a larger variety of sensors may be used for the internal sensor 130 (e.g., many commercial imaging sensors may be used), thereby allowing for greater design freedom of the sensor 100.

Figure 3:
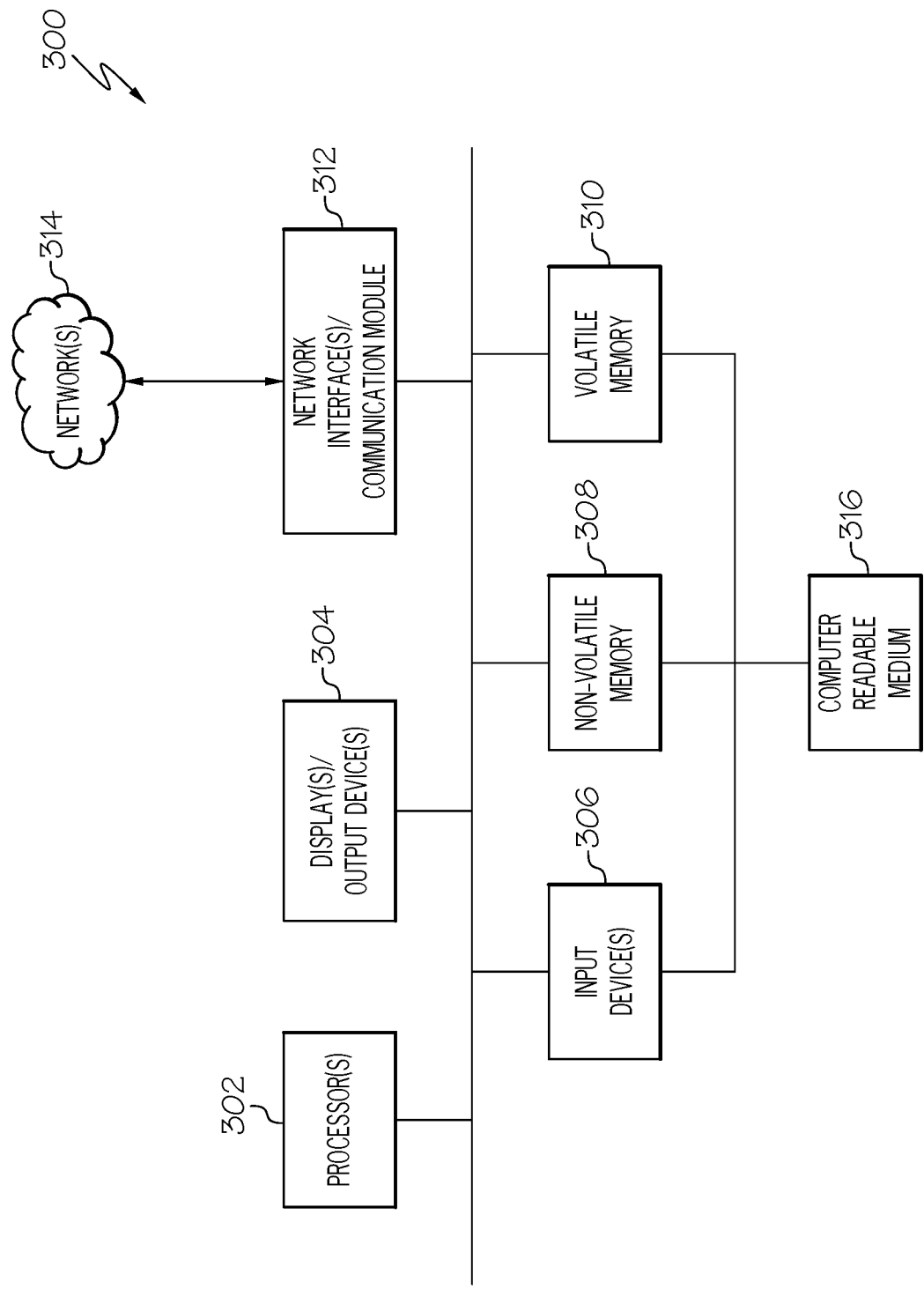
FIG. 3 is a block diagram illustrating computing hardware utilized in one or more devices for implementing various processes and systems, according one or more embodiments described and illustrated herein.

Turning now to FIG. 3, a block diagram illustrates an example of a computing device 300 through which embodiments of the disclosure can be implemented, such as (by way of non-limiting example) a deformable sensor 100, an internal sensor 130, or any other device described herein. The computing device 300 described herein is but one example of a suitable computing device and does not suggest any limitation on the scope of any embodiments presented. Nothing illustrated or described with respect to the computing device 300 should be interpreted as being required or as creating any type of dependency with respect to any element or plurality of elements. In various embodiments, the computing device 300 may include but need not be limited to, a deformable sensor 100 and/or an internal sensor 130. The computing device 300 may be a component of the deformable sensor 100 or may be a component of a remote computing device (e.g., a processor of a robot or a remote computer).

In an embodiment, the computing device 300 includes at least one processor 302 and memory (non-volatile memory 308 and/or volatile memory 310). The computing device 300 can include one or more displays and/or output devices 304 such as monitors, speakers, headphones, projectors, wearable-displays, holographic displays, and/or printers, for example. The computing device 300 may further include one or more input devices 306 which can include, by way of example, any type of mouse, keyboard, disk/media drive, memory stick/thumb-drive, memory card, pen, touch-input device, biometric scanner, voice/auditory input device, motion-detector, camera, scale, etc.

The computing device 300 may include non-volatile memory 308 (ROM, flash memory, etc.), volatile memory 310 (RAM, etc.), or a combination thereof. A network interface 312 can facilitate communications over a network 314 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. Network interface 312 can be communicatively coupled to any device capable of transmitting and/or receiving data via the network 314. Accordingly, the hardware of the network interface 312 can include a communication transceiver for sending and/or receiving any wired or wireless communication. For example, the network interface hardware may include an antenna, a modem, LAN port, Wi-Fi card, WiMax card, mobile communications hardware, near-field communication hardware, satellite communication hardware and/or any wired or wireless hardware for communicating with other networks and/or devices.

A computer readable storage medium 316 may comprise a plurality of computer readable mediums, each of which may be either a computer readable storage medium or a computer readable signal medium. A computer readable storage medium 316 may reside, for example, within an input device 306, non-volatile memory 308, volatile memory 310, or any combination thereof. A computer readable storage medium can include tangible media that is able to store instructions associated with, or used by, a device or system. A computer readable storage medium includes, by way of non-limiting examples: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media and computer readable signal media are mutually exclusive.

A computer readable signal medium can include any type of computer readable medium that is not a computer readable storage medium and may include, for example, propagated signals taking any number of forms such as optical, electromagnetic, or a combination thereof. A computer readable signal medium may include propagated data signals containing computer readable code, for example, within a carrier wave. Computer readable storage media and computer readable signal media are mutually exclusive. The computer readable storage medium 316 may include one or more modules, as described below in connection with FIG. 4.

The computing device 300, such as a deformable sensor 100 or, an internal sensor 130 may include one or more network interfaces 312 to facilitate communication with one or more remote devices, which may include, for example, client and/or server devices. In various embodiments the computing device (for example a robot or deformable sensor) may be configured to communicate over a network with a server or other network computing device to transmit and receive data from one or more deformable sensors 100 on a robot or other device. A network interface 312 may also be described as a communications module, as these terms may be used interchangeably.

Figure 4:
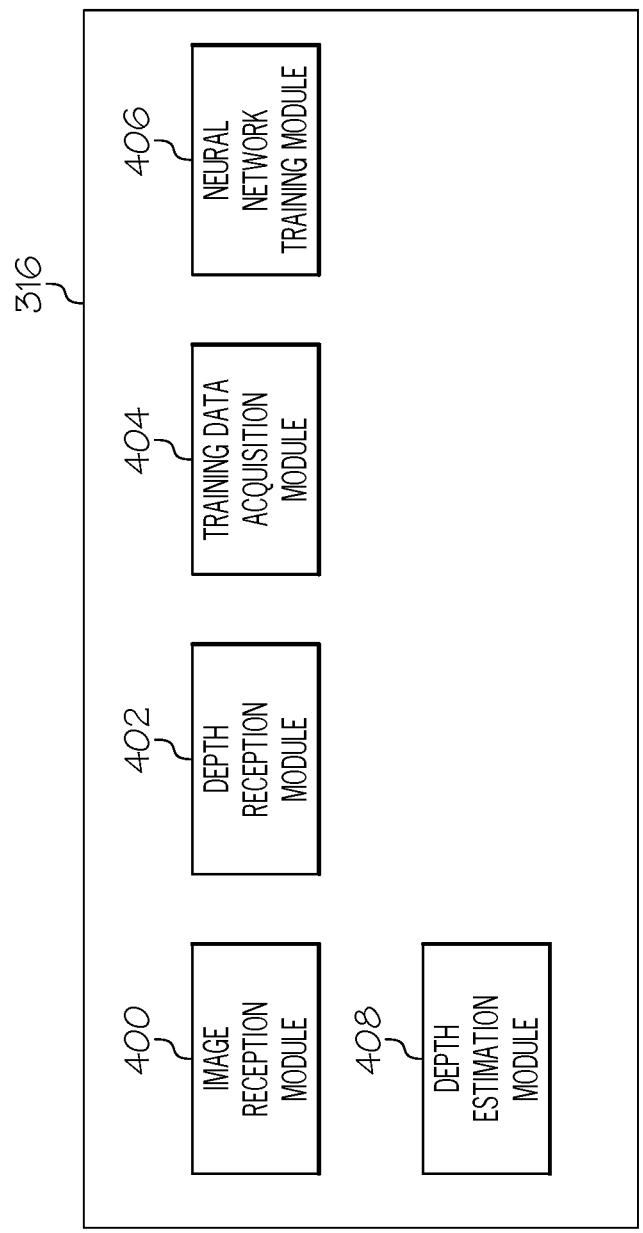
FIG. 4 is a block diagram illustrating memory modules utilized in one or more devices for implementing various processes and systems, according to one or more embodiments described and illustrated herein.

Referring now to FIG. 4, components of the computer readable medium 316 are shown. In particular, the computer readable medium 316 may include an image reception module 400, a depth reception module 402, a training data acquisition module 404, a neural network training module 406, and a depth estimation module 408.

The image reception module 400 may receive an image captured by the internal sensor 130. In particular, the image reception module 400 may receive an image of an internal surface of the membrane 120 captured by the internal sensor 130, as the membrane 120 is deformed by an object. During a training phase, known training objects may be pressed against the sensor 100 and the internal sensor 130 may capture images of the membrane 120 as it is deformed by the training objects. These captured images may be used as training data to train a neural network as described herein. During an operation phase, the sensor 100 may contact an unknown object and the internal sensor 130 may capture an image of the membrane 120 as it is deformed by the unknown object. The sensor 100 may then determine depth values based on the captured image, as described in further detail below.

The depth reception module 402 may receive depth values of different points on the membrane 120 when the membrane 120 is deformed by a training object during a training phase. That is, the depth reception module 402 may receive a distance between the internal sensor 130 and a plurality of points on the deformed membrane 120. As described above, during the training phase, a plurality of training objects may be pressed against the membrane 120 and depth values may be determined by the internal sensor 130 (e.g., an RGB-D sensor). As such, during a training phase, when a training object is pressed against the membrane 120, the depth reception module 402 may receive depth values for the deformed membrane 120.

In one example, during a training phase, the internal sensor 130 may comprise a time-of-flight sensor to determine depth values. In this example, the depth reception module 402 may receive time-of-flight measurements from the time-of-flight sensor and may determine depth values based on the time-of-flight measurements. A time-of-flight sensor may be particularly desirable to determine depth values in indoor scenes.

The training data acquisition module 404 may acquire training data to be used to train a neural network. As explained above, a neural network may be trained to estimate depth based on an image of the membrane 120 when deformed by an object. In particular, a neural network may be trained using training data comprising images of the membrane 120 when deformed by various training objects and known depth values associated with the image (e.g., as determined using a time-of-flight sensor). As such, the training data acquisition module 404 may acquire training data comprising a number of training examples, wherein each training example includes an image of the membrane 120 and known depth values for each pixel of the image.

In some examples, the training data acquisition module 404 may acquire an image and corresponding depth values from an RGB-D sensor that is able to capture an image and determine depth values. In other examples, the training data acquisition module 404 may associate an image received by the image reception module 400 with depth values received by the depth reception module 402 to determine a training example. After acquiring or determining a training example, the training data acquisition module 404 may store the training example in the non-volatile memory 308 or the volatile memory 310. A plurality of training examples acquired by the training data acquisition module 404 may comprise training data that may be used to train a neural network, as described in further detail below.

Figure 5:
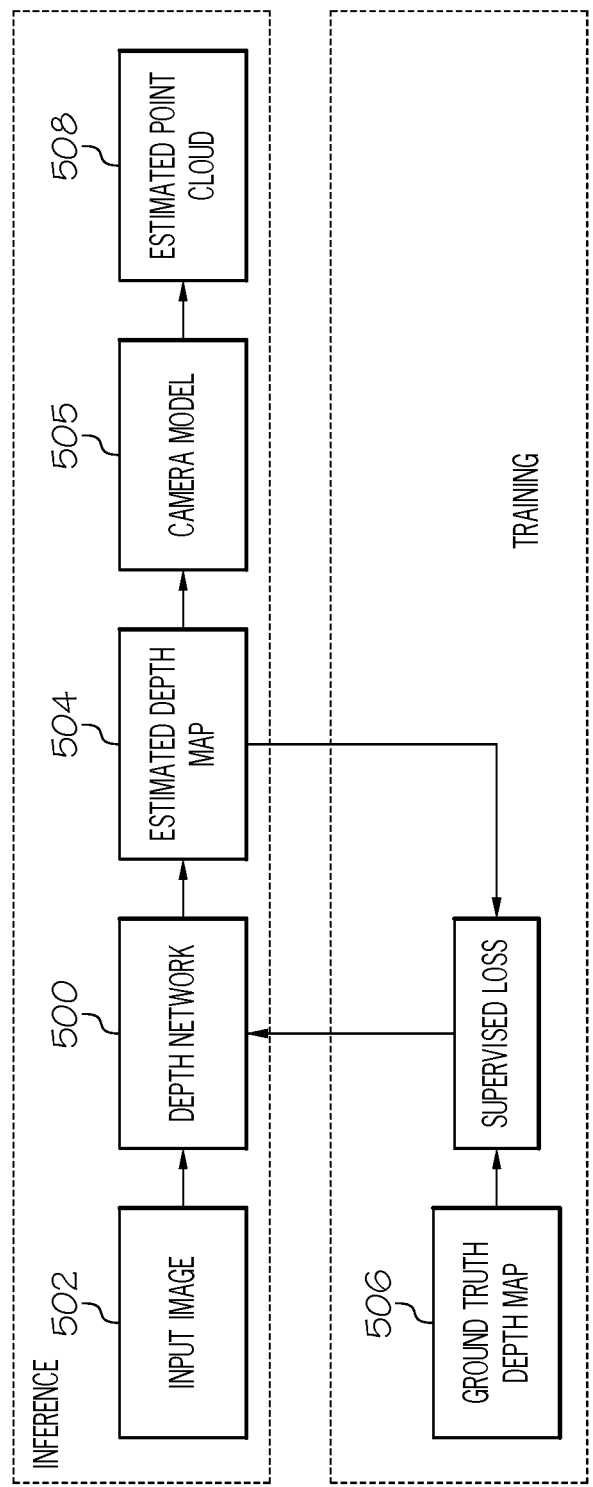
FIG. 5 illustrates an example neural network architecture utilized in one or more devices, according to one or more embodiments described and illustrated herein.

The neural network training module 406 may train a neural network. In particular, the neural network training module 406 may train a neural network to receive an input image of the membrane 120 when deformed by an object and estimate a depth value for each pixel of the image. FIG. 5 shows an example framework for training a neural network.

In the example of FIG. 5, a depth network 500 is a deep neural network used to estimate a depth value for each pixel of an input image. In the example of FIG. 5, the depth network 500 comprises a plurality of encoding layers, a plurality of decoding layers, a feature embedding layer, and a plurality of skip connections. In one example, the depth network 500 may comprise the known PackNet neural network architecture. In another example, the depth network 500 may comprise the known ResNet neural network architecture. In another example, the depth network 500 may comprise the BTS-DSN neural network architecture. However, it should be understood that in other examples, the depth network 500 may comprise any type of deep neural network architecture having any structure and any number of layers.

In the example of FIG. 5, an input image 502 of an interior surface of the membrane 120 is input into the depth network 500 and the depth network 500 outputs an estimated depth map 504 based on the input image 502. During training of the depth network 500, the parameters of the depth network 500 may be trained using training data acquired by the training data acquisition module 404. In particular, as shown in FIG. 5, one training example may comprise an input image 502, as determined by the image reception module 400, and an associated ground truth depth map 506, as determined by the depth reception module 402. During training, a loss value may be determined based on a difference between the estimated depth map 504 determined by the output of the depth network 500 and the ground truth depth map 506. A loss value may be determined for each training example of a training data set and a cost function may be determined by combining the loss function associated with each training example. The neural network training module 406 may train the parameters of the depth network 500 to minimize the cost function based on the training data set. The neural network training module 406 may train the depth network 500 using any known optimization algorithm. Once the neural network is trained, it may be used to predict depth based on an input image, as discussed below.

Referring back to FIG. 4, the depth estimation module 408 may estimate a depth value for each pixel of an image captured by the internal sensor 130 using the neural network trained by the neural network training module 406. For example, as shown in FIG. 5, a two-dimensional input image 502 may be input into the trained depth network 500, which may output an estimated depth map 504 based on the input image 502 and the parameters of the trained depth network 500. The depth map 504 may comprise a depth of each pixel in the input image 502.

In some examples, as shown in FIG. 5, a camera model 505 may be associated with the internal sensor 130. The camera model 505 may be based on the geometry of the internal sensor 130 and may be used to convert a two-dimensional image captured by the internal sensor 130 into a three-dimensional image. Therefore, in some examples, the depth estimation module 408 may input the two-dimensional depth map 504 output by the depth network 500 into the camera model 505 to determine a three-dimensional estimated point cloud 508 comprising an estimated shape of the object being detected by the sensor 100. The point cloud 508 may then be used by other applications, such as a robot utilizing the sensor 100 to detect the shape of objects.

Figure 6:
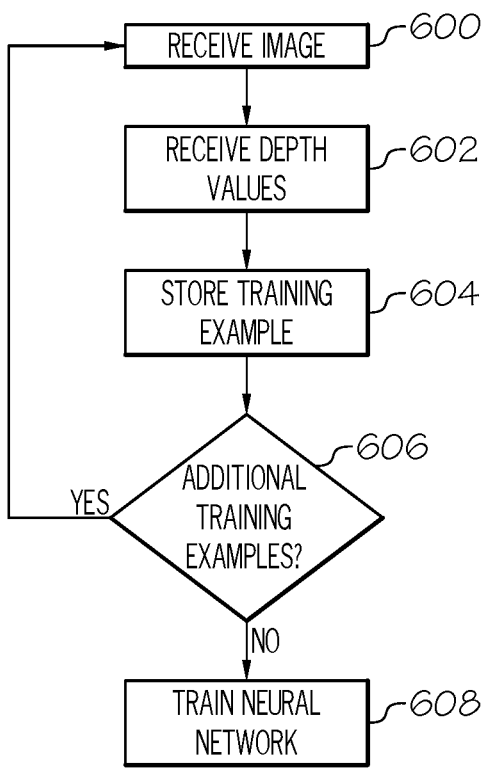
FIG. 6 is a flow chart depicting an exemplary process of training a neural network, according to one or more embodiments described and illustrated herein.

Turning now to FIG. 6, a flowchart illustrates an exemplary process for training a neural network to estimate depth of the membrane 120 based on an image captured by the internal sensor 130. At step 600, the image reception module 400 may receive an image captured by the internal sensor 130 when a training object makes contact with the sensor 100. The training object may deform the membrane 120 and the internal sensor 130 may capture an image of the deformed membraned 120. In some examples, the captured image may be an RGB image. In other examples, the captured image may be a grayscale image.

At step 602, the depth reception module 402 may receive a depth value of a plurality of points on the membrane 120 when the training object is contacting the membrane 120, thereby deforming the membrane 120. The depth values may be determined by a time-of-flight sensor. In some examples, the depth values may be captured by a time-of-flight sensor or other sensor at the same time that the internal sensor 130 captures an image of the membrane 120. In embodiments, each of the depth values received by the depth reception module 402 may comprise a depth value associated with one pixel of the image captured by the image reception module 400.

At step 604, the training data acquisition module 404 may store a training example comprising the image received by the image reception module 400 and the depth values captured by the depth reception module 402. In some examples, the training data acquisition module 404 may associate each depth value received by the depth reception module 402 with a pixel of the image received by the image reception module 400. Thus, the training example stored by the training data acquisition module 404 may comprise an image of the deformed membrane 120 and ground truth values comprising a depth of each pixel of the image.

At step 606, the training data acquisition module 404 may determine whether additional training examples are to be added to a training data set. For example, the training data acquisition module 404 may determine whether there are additional training objects to be used to acquire training examples. If there are additional training examples to be added to a training data set (yes at step 606), then control returns to step 600 and a new training example may be acquired with a different training object contacting the membrane 120. If there are no additional training examples to be added to a training data set (no at step 606), then control advances to step 608.

At step 608, the neural network training module 406 may train a neural network using the acquired training data. In particular, the neural network training module 406 may train the neural network to receive an input image captured by the internal sensor 130 and output an estimated depth value for each pixel of the input image. The neural network training module 406 may train the parameters of the neural network to minimize a cost function based on a difference between the ground truth depth values of the training data and the depth values estimated by the neural network. The neural network training module 406 may train the neural network using any known optimization algorithm.

Figure 7:
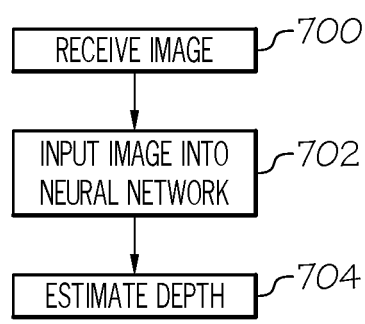
FIG. 7 is a flow chart depicting an exemplary process of determining depth associated with an image, according to one or more embodiments described and illustrated herein.

Turning now to FIG. 7, a flowchart illustrates an exemplary process for estimating depth values using a neural network trained using the example of FIG. 6. In particular, when an object contacts the sensor 100 and thereby deforms the membrane 120, the example of FIG. 7 may estimate depth values for points on the deformed membrane 120.

At step 702, the image reception module 400 may receive an image captured by the internal sensor 130. In particular, the internal sensor 130 may capture an image of the membrane 120 as it is deformed by an object contacting the sensor 100.

At step 704, the depth estimation module 408 may input the pixel values of the captured image into the neural network trained by the neural network training module 406 (e.g., as described above with reference to FIG. 6). When the pixel values of the captured image are input into the trained neural network, the neural network may output an estimated depth value for each pixel of the image. Thus, at step 404, the depth estimation module 408 may estimate depth values for each pixel of the captured image based on the output of the trained neural network. The shape and pose of the object contacting the sensor 100 may then be determined based on the determined depth values.

It should now be understood that embodiments of the present disclosure are directed deformable sensors capable of detecting contact with an object as well as a geometric shape and pose of an object using an imaging sensor to determine depth. A sensor may comprise a deformable membrane that may deform when contacted by an object. An internal imaging sensor may capture an image of the deformed membrane and the captured image may be input into a trained neural network. The trained neural network may then output an estimated depth value for each pixel of the image.

The neural network may be trained using training data comprising a plurality of training examples, wherein each training example comprises an image of the deformed membrane of the sensor when in contact with a training object, and ground truth values comprising known depth values for each pixel of the image. The training examples may be obtained by pressing each training object against the membrane and capturing an image of the deformed membrane using the imaging sensor and determining depth values of the deformed membrane, for example by using a time-of-flight sensor. The depth values may then be associated with the captured image to form a training example.

Once a sufficient number of training examples have been obtained, the neural network may be trained using supervised machine learning techniques. Once the neural network has been trained, the trained neural network may be used to estimate depth based on images captured by the imaging sensor, without the need to directly measure depth values using a time-of-flight or other sensor.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A deformable sensor comprising:
an enclosure comprising a deformable membrane, the enclosure configured to be filled with a medium; and
an imaging sensor disposed within the enclosure, having a field of view configured to be directed toward a bottom surface of the deformable membrane,
wherein the imaging sensor is configured to capture an RGB_image of the deformable membrane; and
wherein the deformable sensor is configured to determine depth values for a plurality of points on the deformable membrane based on the RGB image captured by the imaging sensor and a trained neural network that takes the RGB image as input and outputs depth values.

2. The deformable sensor of claim 1, wherein the deformable sensor is further configured to determine a shape of an object contacting the deformable sensor based on the determined depth values.

3. The deformable sensor of claim 1, wherein the trained neural network comprises a PackNet architecture.

4. The deformable sensor of claim 1, wherein the trained neural network comprises a ResNet architecture.

5. The deformable sensor of claim 1, wherein the trained neural network comprises a BTS-DSN architecture.

6. The deformable sensor of claim 1, wherein the imaging sensor comprises a monocular.

7. The deformable sensor of claim 1, wherein the neural network is trained to estimate depth values for the RGB image captured by the imaging sensor using training data comprising a plurality of training examples, wherein each training example comprises an RGB image captured by the imaging sensor when a training object makes contact with the deformable sensor, and ground truth values comprising a known depth value associated with each pixel of the RGB image captured by the imaging sensor.

8. The deformable sensor of claim 7, wherein the known depth value associated with each pixel comprises a distance between the imaging sensor and a point on the deformable membrane captured by each pixel in the RGB image captured by the imaging sensor.

9. The deformable sensor of claim 7, wherein the known depth value associated with each pixel is determined by a depth sensor.

10. The deformable sensor of claim 9, wherein the depth sensor comprises a time-of-flight sensor.

11. The deformable sensor of claim 7, wherein the deformable sensor is configured to train the neural network to minimize a cost function based on a difference between the ground truth values and the depth values estimated by the neural network.

12. A method comprising:
pressing a training object against a deformable membrane of a deformable sensor, the deformable sensor comprising an enclosure comprising the deformable membrane, the enclosure configured to be filled with a medium;
with an imaging sensor disposed within the enclosure, capturing an RGB image of the deformable membrane while the training object contacts the deformable membrane;
determining a depth value associated with each pixel of the RGB image captured by the imaging sensor; and
storing the RGB image of the deformable membrane and the depth value associated with each pixel of the RGB image as a training example for a neural network; and
using the training example to train the neural network to estimate the depth value associated with each pixel based on the RGB image of the deformable membrane.

13. The method of claim 12, further comprising:
receiving, from a depth sensor disposed within the enclosure, time-of-flight data comprising time-of-flight from the depth sensor to a plurality of points on the deformable membrane; and
determining the depth value associated with each pixel of the RGB image captured by the imaging sensor based on the time-of-flight data.

14. The method of claim 13, further comprising:
associating each of the plurality of points on the deformable membrane with a pixel of the RGB image captured by the imaging sensor.

15. The method of claim 12, further comprising:
pressing a plurality of training objects against the deformable membrane;
with the imaging sensor, capturing RGB images of the deformable sensor while each of the training objects contacts the deformable membrane;
determining depth values associated with each pixel of each of the RGB images captured by the imaging sensor;
assembling training data comprising the plurality of RGB images captured by the imaging sensor and the depth values associated with each of the RGB images; and
training the neural network using the training data.

16. A method comprising:
pressing an object against a deformable membrane of a deformable sensor, the deformable sensor comprising an enclosure comprising the deformable membrane, the enclosure configured to be filled with a medium;
with an imaging sensor disposed within the enclosure, capturing an RGB image of the deformable membrane while the object contacts the deformable membrane; and
using a trained neural network, which takes the RGB image as input and outputs depth values, to determine a depth value associated with each pixel of the RGB image captured by the imaging sensor.

17. The method of claim 16, further comprising:
determining a shape of the object contacting the deformable sensor based on the determined depth values.

18. The method of claim 16, wherein the neural network is trained to estimate depth values for the imaging captured by the imaging sensor using training data comprising a plurality of training examples, wherein each training example comprises an RGB image captured by the imaging sensor when a training object makes contact with the deformable sensor, and ground truth values comprising a known depth associated with each pixel of the RGB image captured by the imaging sensor.

* * * * *

UNITED STATES PATENT AND TRADEMARK OFFICE
CERTIFICATE OF CORRECTION

PATENT NO. : 12,151,361 B2
APPLICATION NO. : 17/147935
DATED : November 26, 2024
INVENTOR(S) : Rares A. Ambrus et al.

It is certified that error appears in the above-identified patent and that said Letters Patent is hereby corrected as shown below:

On the Title Page

In page 2, Column 1, item (56), other publications, cite no 4, delete "https://disneyresearch.com/publication/design-of-a-soff-upper-body-Obot/, 8 pages" and insert --https://la.disneyresearch.com/publication/design-of-a-soft-upper-body-robot/, 7 pages.--, therefor.
In page 2, Column 2, item (56), other publications, cite no 2, delete "https://www.researchgate.net/oublication/290509006_1n-Hand_Object_Pose_Estimation_Using_Covariance-Sased_Tactile_To_Geometry_Matching," and insert --https://www.researchgate.net/publication/290509006_In-Hand_Object_Pose_Estimation_Using_Covariance-Based_Tactile_To_Geometry_Matching,--, therefor.
In page 2, Column 2, item (56), other publications, cite no 6, before "2011)", insert --(--.
In page 2, Column 2, item (56), other publications, cite no 7, before "pages", delete "B" and insert --8--, therefor.

In the Specification

In Column 4, Line(s) 54, delete "pattered" and insert --patterned--, therefor.
In Column 10, Line(s) 65, after "deformed", delete "membraned" and insert --membrane--, therefor.

In the Claims

In Column 13, Line(s) 12, Claim 1, delete "RGB_image" and insert --RGB image--, therefor.
In Column 14, Line(s) 54, Claim 18, before "captured", delete "imaging" and insert --images--, therefor.

Signed and Sealed this
Fifteenth Day of April, 2025

Coke Morgan Stewart
*Acting Director of the United States Patent and Trademark Office*